(12) United States Patent
Wu et al.

(10) Patent No.: US 9,701,077 B2
(45) Date of Patent: Jul. 11, 2017

(54) AUTOMATIC CANVAS WRAPPING MACHINE

(71) Applicant: SANLUX CO., LTD, Shaoxing County, Zhejiang Province (CN)

(72) Inventors: Peisheng Wu, Shaoxing County (CN); Shuixiang Shi, Shaoxing County (CN); Xinfu Zhu, Shaoxing County (CN); Lixiang Wu, Shaoxing County (CN)

(73) Assignee: Sanlux Co., Ltd., Shaoxing County, Zhejiang Province (CN)

( * ) Notice: Subject to any disclaimer, the term of this patent is extended or adjusted under 35 U.S.C. 154(b) by 0 days.

(21) Appl. No.: 14/929,728

(22) Filed: Nov. 2, 2015

(65) Prior Publication Data

US 2016/0121565 A1    May 5, 2016

(30) Foreign Application Priority Data

Oct. 31, 2014    (CN) .......................... 2014 1 0599616

(51) Int. Cl.

| | | |
|---|---|---|
| *B29C 65/02* | (2006.01) | |
| *B29C 65/48* | (2006.01) | |
| *B32B 37/02* | (2006.01) | |
| *B32B 37/12* | (2006.01) | |
| *B32B 38/04* | (2006.01) | |
| *B32B 43/00* | (2006.01) | |
| *B29D 29/00* | (2006.01) | |

(52) U.S. Cl.

CPC ................................. *B29D 29/00* (2013.01)

(58) Field of Classification Search

USPC ....... 156/391, 433, 436, 439, 440, 494, 495, 156/496, 510, 522, 538, 539, 543, 554, 156/555

See application file for complete search history.

(56) References Cited

FOREIGN PATENT DOCUMENTS

| | | |
|---|---|---|
| CN | 103963327 A | 8/2014 |
| JP | S6299099 A | 5/1957 |

*Primary Examiner* — Sing P Chan

(74) *Attorney, Agent, or Firm* — Muncy, Geissler, Olds & Lowe, P.C.

(57) ABSTRACT

An automatic canvas wrapping machine including a canvas conveying device, a yarn core mounting device, a canvas wrapping device, and a cutting device is described herein. The canvas conveying device conveys a rubberized canvas for wrapping a yarn core. The yarn core mounting device is disposed in a conveying direction of the canvas conveying device, and the yarn core is mounted in the yarn core mounting device and attached to the rubberized canvas conveyed by the canvas conveying device. The canvas wrapping device is disposed on one side of the yarn core mounting device and presses the rubberized canvas reciprocatingly along a direction vertical to the conveying direction, so as to tightly attach the rubberized canvas to the yarn core. The cutting device is disposed at an upper part of the canvas conveying device and cuts the rubberized canvas after the canvas wrapping device completes canvas wrapping.

11 Claims, 4 Drawing Sheets

US 9,701,077 B2

AUTOMATIC CANVAS WRAPPING MACHINE

CROSS-REFERENCE TO RELATED APPLICATIONS

This Non-provisional application claims priority under 35 U.S.C. §119(a) on Patent Application No(s). 201410599616.5 filed in People's Republic of China on Oct. 31, 2014, the entire contents of which are hereby incorporated by reference.

BACKGROUND OF THE INVENTION

Field of the Invention

The present invention belongs to a manufacturing technical field of a drive belt molding apparatus and, more particularly, relates to an automatic canvas wrapping machine.

Description of the Related Art

A drive belt is a device for transferring power generated by rotation of a motor or an engine of a prime mover to mechanical apparatus through a rubber belt via a belt pulley. The drive belt is widely applied in the fields of motors, agricultural machines, machine tools, automobiles, ships, household appliances, office equipment and so on. The drive belt has the advantages of free speed change, far and near driving, simple structure and so on. A rubber V-belt is the most widely used one in drive belts.

Existing rubberized canvas wrapping apparatus for the rubber V-belt generally consists of a rubberized canvas, base compound rubber and a wrapping mechanism. The rubberized canvas is the canvas after rubberizing treatment. For example, the canvas can be dipped in liquid rubber or infixed with rubber. During wrapping, a yarn core is assembled to a driving wheel and a driven wheel, the base compound rubber is drawn out to attach to the yarn core, and the rubberized canvas is attached to the base compound rubber and then wrapped. The base compound rubber and the canvas are cut off, compacted and then wound up, and thus the wrapping operation is completed. This wrapping apparatus has the defect that the precision of manually cutting the base compound rubber and the rubberized canvas is poor. When the base compound rubber is drawn and attached, the base compound rubber may not be uniformly drawn according to technical requirements, so that the weight uniformity of the base compound rubber is affected, defective thin belts are easily produced, the canvas wrapping precision is low, and the defective rate is high.

Moreover, according to the existing rubberized canvas wrapping apparatus for the rubber V-belt, a person only operates one wrapping apparatus, so that the production efficiency is low and the corresponding manufacture cost is high.

BRIEF SUMMARY OF THE INVENTION

To solve the problem of low canvas wrapping precision of existing rubberized canvas wrapping apparatus for a rubber V-belt, the present invention provides an automatic canvas wrapping machine.

To achieve the above objective, the present invention provides an automatic canvas wrapping machine for automatically wrapping a yarn core with a rubberized canvas, and the automatic canvas wrapping machine includes a canvas conveying device, a yarn core mounting device, a canvas wrapping device, and a cutting device. The canvas conveying device conveys a rubberized canvas for wrapping the yarn core. The yarn core mounting device is disposed in a conveying direction of the canvas conveying device, and the yarn core is mounted in the yarn core mounting device and attached to the rubberized canvas conveyed by the canvas conveying device. The canvas wrapping device is disposed on one side of the yarn core mounting device and presses the rubberized canvas reciprocatingly along a direction vertical to the conveying direction of the canvas conveying device, so as to tightly attach the rubberized canvas to the yarn core. The cutting device is disposed at an upper part of the canvas conveying device, and the cutting device cuts the rubberized canvas after the canvas wrapping device completes canvas wrapping.

In one embodiment of the invention, the canvas wrapping device may include a canvas wrapping roller, a canvas wrapping guide rail assembly connected with the canvas wrapping roller, and a canvas wrapping telescopic cylinder for driving the canvas wrapping guide rail assembly to move.

In one embodiment of the invention, the yarn core mounting device may include a driving wheel and a driven wheel disposed along the conveying direction of the canvas conveying device, the driving wheel may drive the driven wheel to rotate, and the yarn core may rotate along with the driving wheel and the driven wheel and is continually attached to the rubberized canvas in rotating process.

In one embodiment of the invention, the yarn core mounting device may further include a tensioning wheel and a tensioning cylinder connected with the tensioning wheel, and the yarn core may be mounted on the driving wheel, the driven wheel, and the tensioning wheel.

In one embodiment of the invention, a guide rail may further be disposed behind the yarn core mounting device along the conveying direction of the canvas conveying device, and both the tensioning wheel and the tensioning cylinder may be disposed on the guide rail.

In one embodiment of the invention, a guide rail may further be disposed on one side of the yarn core mounting device along the direction vertical to the conveying direction of the canvas conveying device, and both the tensioning wheel and the tensioning cylinder may be disposed on the guide rail.

In one embodiment of the invention, a center distance adjusting assembly for adjusting a center distance between the tensioning wheel and the driving wheel and the center distance between the tensioning wheel and the driven wheel may be further disposed on the guide rail.

In one embodiment of the invention, the canvas conveying device may include a rubberized canvas reel, a canvas conveying wheel, a canvas replacing assembly, and a canvas conveying platform sequentially connected with each other along the conveying direction.

In one embodiment of the invention, the canvas conveying device may further include a canvas pressing wheel disposed between the yarn core mounting device and the canvas wrapping device.

In one embodiment of the invention, the automatic canvas wrapping machine may further include a programmable logic controller (PLC) control device for controlling the canvas conveying device, the yarn core mounting device, the canvas wrapping device, and the cutting device.

It could be known from the above technical solutions that, in the embodiments of the present invention, the yarn core mounting device drives the yarn core to rotate, and the yarn core is attached to the rubberized canvas conveyed by the canvas conveying device. During the rotating process, the canvas wrapping device reciprocates along the direction vertical to the conveying direction to continually press the rubberized canvas, so that the rubberized canvas and the yarn core are tightly attached together and the yarn core is wrapped with the rubberized canvas. In one canvas wrapping process, the automatic canvas wrapping machine automatically wraps canvas in fixed length. The cutting device cuts off the rubberized canvas once the wrapping is completed, the canvas wrapping process automatically ends, and thus the wrapping is completed. The canvas conveying device replaces the secondary layer of rubberized canvas, and the above process is repeated to complete the wrapping once again, so that the canvas wrapping of the yarn core is automatically realized.

According to the automatic canvas wrapping machine in the invention, the cutting of the rubberized canvas is automatically completed through the cutting device, and the canvas wrapping length of the rubberized canvas is automatically controlled. Compared with the existing canvas wrapping apparatus adopting manual length fixation and manual cutting, the automatic canvas wrapping machine in this invention has higher control precision. The yarn core mounting device can accurately control the drawing length of the yarn core, so that when the rubberized canvas is attached, good uniformity and higher control precision are realized, and the yield of products is greatly improved.

To make the above-mentioned and other purposes, features and advantages of the present invention better understood, preferred embodiments will be described in detail below in combination with the accompanying drawings.

DETAILED DESCRIPTION OF THE INVENTION

Figure 1:
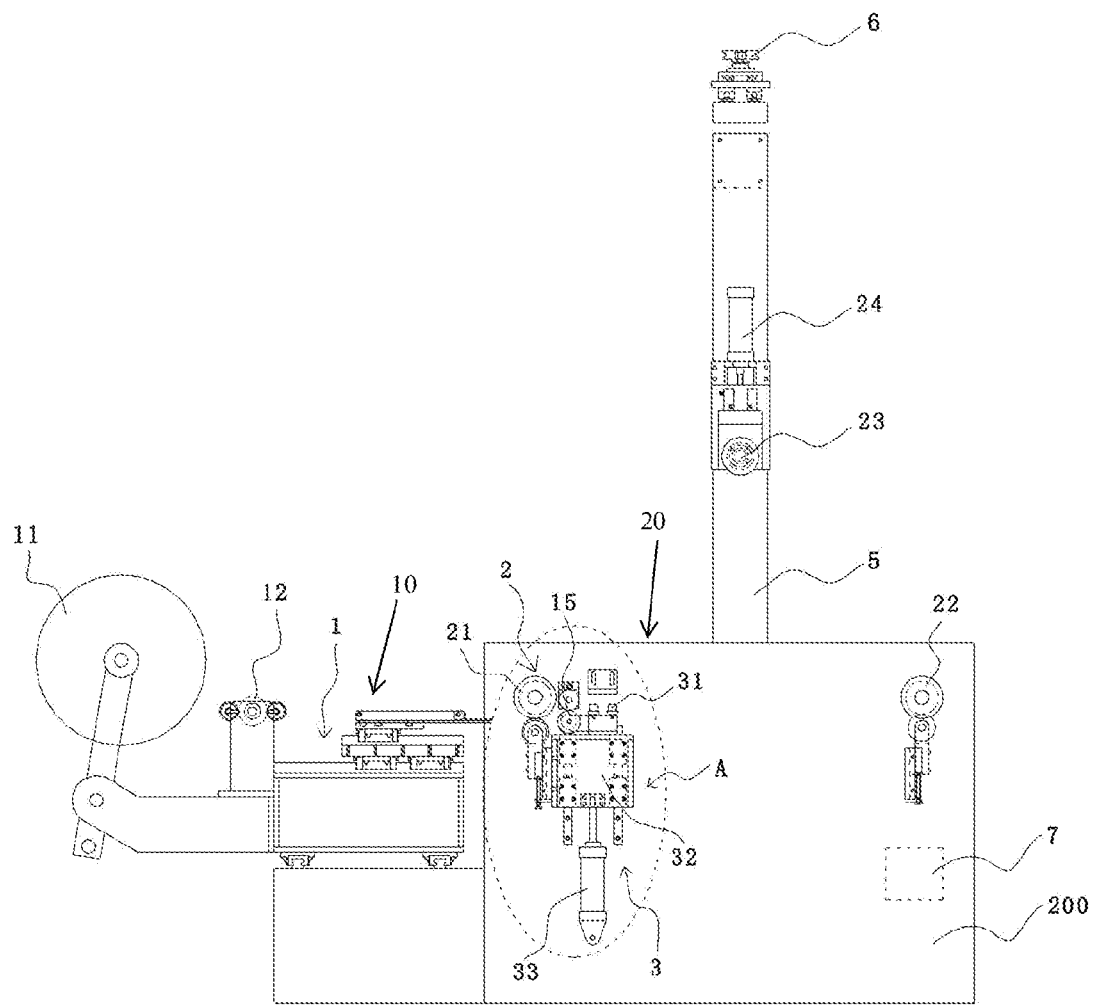
FIG. 1 is a front view showing an automatic canvas wrapping machine according to one embodiment of the present invention.
Figure 2:
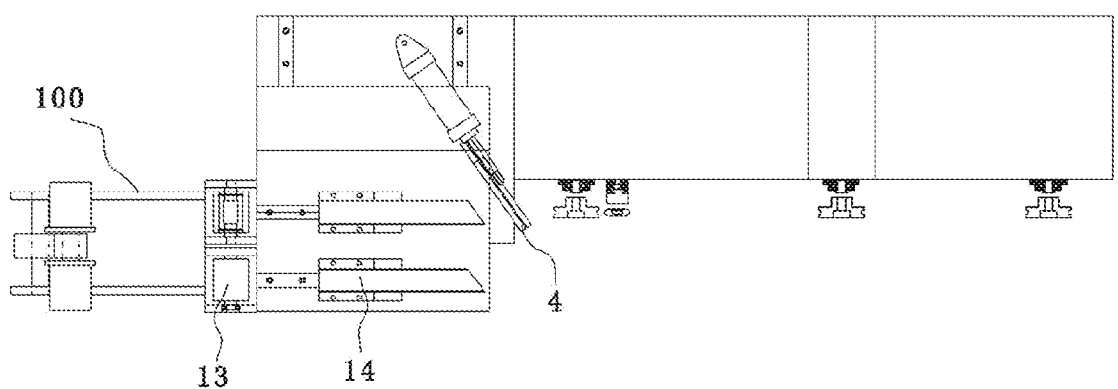
FIG. 2 is a top view showing the automatic canvas wrapping machine shown in FIG. 1.
Figure 3:
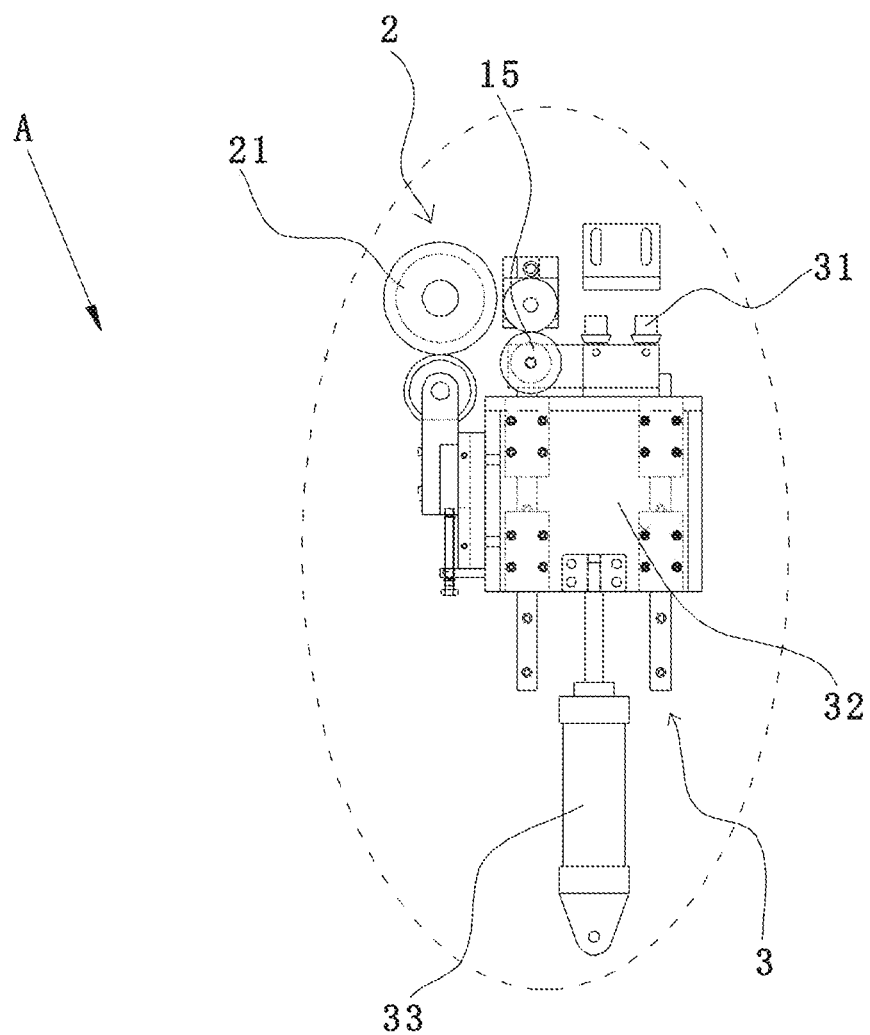
FIG. 3 is an enlarged diagram of A in the automatic canvas wrapping machine shown in FIG. 1.
Figure 4:
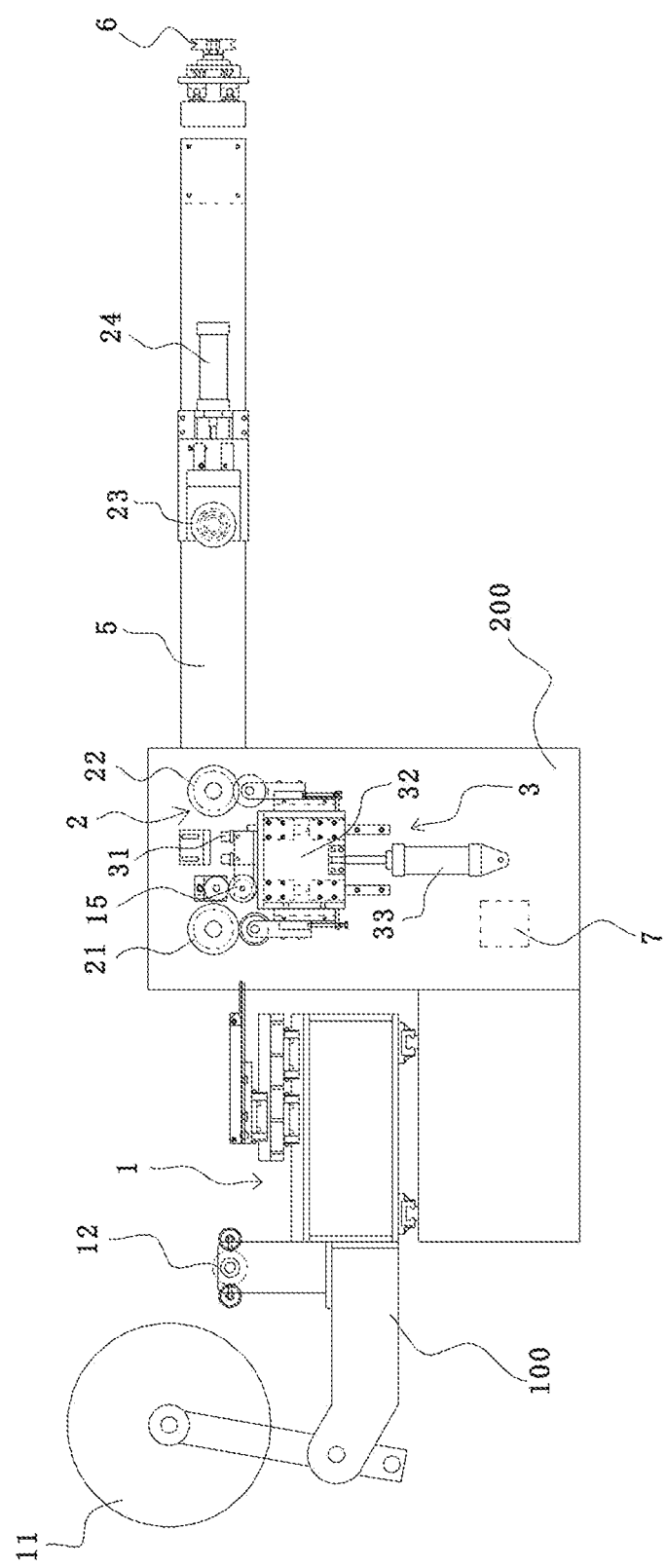
FIG. 4 is a front view showing an automatic canvas wrapping machine according to another embodiment of the invention.
Figure 5:
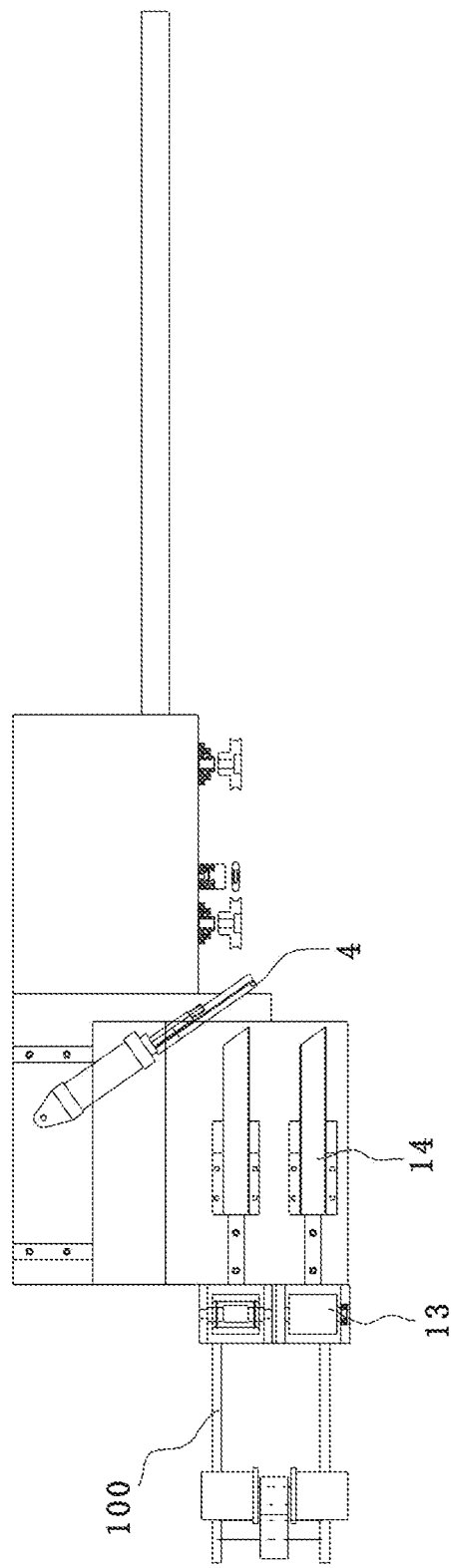
FIG. 5 is a top view showing the automatic canvas wrapping machine shown in FIG. 4.

FIG. 1 is a front view showing an automatic canvas wrapping machine according to one embodiment of the present invention. FIG. 2 is a top view showing the automatic canvas wrapping machine shown in FIG. 1. FIG. 3 is an enlarged diagram of A in the automatic canvas wrapping machine shown in FIG. 1. FIG. 4 is a front view showing an automatic canvas wrapping machine according to another embodiment of the invention. FIG. 5 is a top view showing the automatic canvas wrapping machine shown in FIG. 4. Please refer to FIG. 1 to FIG. 5 together.

As shown in FIG. 1, the automatic canvas wrapping machine in the embodiment includes a canvas conveying unit 10, a yarn core mounting unit 20, a canvas conveying device 1 a yarn core mounting device 2, a canvas wrapping device 3, and a cutting device 4. The canvas conveying device 1 conveys a rubberized canvas for wrapping a yarn core. The yarn core mounting device 2 is disposed in a conveying direction of the canvas conveying device 1, and the yarn core is mounted in the yarn core mounting device 2 and attached to the rubberized canvas conveyed by the canvas conveying device 1. The canvas wrapping device 3 is disposed on one side of the yarn core mounting device and presses the rubberized canvas reciprocatingly along a direction vertical to the conveying direction of the canvas conveying device 1, so as to tightly attach the rubberized canvas to the yarn core. The cutting device 4 is disposed at an upper part of the canvas conveying device 1, and the cutting device 4 cuts the rubberized canvas after the canvas wrapping device 3 completes canvas wrapping.

In this embodiment, both the canvas conveying device 1 and the cutting device 4 are disposed on a frame 100. The canvas conveying device 1 includes a rubberized canvas reel 11 for fixing the rubberized canvas, a canvas conveying wheel 12 for providing power for conveying the rubberized canvas, a canvas replacing assembly 13 for replacing the rubberized canvas of different wrapping layers, and a canvas conveying platform 14. The yarn core mounting device 2 includes a driving wheel 21 and a driven wheel 22 which are disposed along the conveying direction of the canvas conveying device 1. The yarn core is disposed on the driving wheel 21 and the driven wheel 22 and rotates along with rotation of the driving wheel 21 and the driven wheel 22. The yarn core is continually attached to the rubberized canvas conveyed by the canvas conveying device 1 in rotating process.

Further, to better adjust the drawing effect of the yarn core to achieve better uniformity when the rubberized canvas is attached, in this embodiment, the yarn core mounting device 2 further includes a tensioning wheel 23. The tensioning wheel 23 can adjust the tensioning force of the yarn core on the driving wheel 21 and the driven wheel 22. In this embodiment, a tensioning cylinder 24 for controlling the tensioning state of the tensioning wheel 23 is further disposed on one side of the tensioning wheel 23, and the tensioning wheel 23 is disposed on a guide rail 5. As shown in FIG. 1, the guide rail 5 is disposed on one side of the yarn core mounting device 2 along the direction vertical to the conveying direction of the canvas conveying device 1. However, this invention is not limited thereto. In other embodiments, according to the practical use condition (e.g. the limitation of a mounting position), the guide rail 5 may be disposed behind the yarn core mounting device 2 along the conveying direction of the canvas conveying device 1, and the whole device is expanded along the length direction (as shown in FIG. 4 and FIG. 5), so that the automatic canvas wrapping machine is flexible and convenient to use.

In practical use, for the rubber V-belt in different specifications and types, the drawing length needed by the yarn core is also different, that is, the distance between the tensioning wheel 23 and the driving wheel 21 and the distance between the tensioning wheel 23 and the driven wheel 22 are different. In this embodiment, to achieve the canvas wrapping and processing of the rubber V-belt in different specifications and types so as to improve the universality of the automatic canvas wrapping machine, a center distance adjusting assembly 6 for adjusting the center distance between the tensioning wheel 23 and the driving wheel 21 and the center distance between the tensioning wheel 23 and the driven wheel 22 is disposed on the guide rail 5. In the practical use process, a control system automatically adjusts the center distance adjusting assembly 6 according to the specification of the rubber V-belt to be processed, so that the tensioning wheel 23 automatically runs to the required size. In this embodiment, the center distance adjusting assembly 6 is an adjusting valve. However, this invention is not limited thereto.

In this embodiment, the canvas wrapping device 3 includes a canvas wrapping roller 31, a canvas wrapping guide rail assembly 32 connected with the canvas wrapping roller 31, and a canvas wrapping telescopic cylinder 33 for driving the canvas wrapping guide rail assembly 32 to move. The canvas wrapping telescopic cylinder 33 provides a reciprocating driving force to drive the canvas wrapping guide rail assembly 32 to reciprocate along the direction vertical to the conveying direction of the canvas conveying device 1, to continuously push the canvas wrapping roller 31 to the rubberized canvas, so that the rubberized canvas is sufficiently bonded with the yarn core to complete canvas wrapping. However, the specific structure of the canvas wrapping device 3 in the invention is not limited thereto. In other embodiments, the canvas wrapping device 3 may be a squeezing device, such as a spring, for realizing reciprocating movements.

In the practical canvas wrapping process, since the rubberized canvas has certain elasticity, the edge of the rubberized canvas may be warped during the conveying process. Thus, the conveyed rubberized canvas may be folded, which is not favorable for subsequent conveying of the rubberized canvas and affects the canvas wrapping precision at the same time. In view of this, in this embodiment, the canvas conveying device 1 further includes a canvas pressing wheel 15 disposed between the yarn core mounting device 2 and the canvas wrapping device 3. During the conveying process of the rubberized canvas, the canvas pressing wheel 15 exerts certain pressure to the rubberized canvas, so that the edge of the rubberized canvas cannot be warped. Moreover, the process of conveying the rubberized canvas from the canvas pressing wheel 15 to attach the yarn core is very short, so that the rubberized canvas is unlikely to warp again. Therefore, the conveying of the rubberized canvas is facilitated, and the canvas wrapping precision is greatly improved at the same time.

In this embodiment, both the yarn core mounting device 2 and the canvas wrapping device 3 are disposed on a host case 200, and a programmable logic controller (PLC) control device 7 for controlling the canvas conveying device 1, the yarn core mounting device 2, the canvas wrapping device 3 and the cutting device 4 is further disposed in the host case 200. Under the control of the PLC control device 7, the canvas conveying, canvas wrapping, and cutting are automatically completed.

The working process of the automatic canvas wrapping machine provided by the present invention will be described in detail below in combination with FIG. 1.

The yarn core is mounted on the yarn core mounting device 2, and a rubberized canvas is mounted on the rubberized canvas reel 11. A power supply is started, the type and specification of a rubber V-belt is input on a numerical control panel on the host case 200, and the canvas wrapping length and the number of the canvas wrapping layers are set in the PLC control device 7. According to the type and specification of the rubber V-belt, the tensioning wheel 23 is fed to a standard size under the drive of the center distance adjusting assembly 6 and is automatically tensioned under the action of the tensioning cylinder 24. The canvas conveying wheel 12 conveys the rubberized canvas on the rubberized canvas reel 11 to the canvas conveying platform 14 under the control of the PLC control device 7. The canvas conveying platform 14 conveys the rubberized canvas to the canvas pressing wheel 15 through the cutting device 4. The rubberized canvas is pressed by the canvas pressing wheel 15 and then attached to the yarn core. The canvas wrapping telescopic cylinder 33 on the canvas wrapping device 3 pushes the canvas wrapping guide rail assembly 32 to move up and down, thus to press the canvas wrapping roller 31 onto the yarn core. After the set canvas wrapping length is obtained, the PLC control device 7 controls the canvas conveying device 1, the yarn core mounting device 2, and the canvas wrapping device 3 to stop canvas wrapping and controls the cutting device 4 to cut off the rubberized canvas, and the apparatus automatically ends the canvas wrapping process.

After the first layer of rubberized canvas is wrapped, the canvas replacing assembly 13 automatically replaces the rubberized canvas to carry out the wrapping of the second layer of rubberized canvas, and the canvas wrapping process is the same as that of the first layer of rubberized canvas. When the number of the canvas wrapping layers reaches a preset value, the whole canvas wrapping process is completed. The canvas conveying device 1 and the canvas wrapping device 3 are automatically disengaged, and the center distance adjusting assembly 6 and the tensioning cylinder 24 are relaxed. The wrapped yarn core is taken out, and the whole canvas wrapping process is automatically completed.

To sum up, in the embodiments of the present invention, the yarn core mounting device 2 drives the yarn core to rotate, and the yarn core is attached to the rubberized canvas conveyed by the canvas conveying device 1. During the rotating process, the canvas wrapping device 3 reciprocates along the direction vertical to the conveying direction to continually press the rubberized canvas, so that the rubberized canvas and the yarn core are tightly attached together and the yarn core is wrapped with the rubberized canvas. In one canvas wrapping process, the automatic canvas wrapping machine automatically wraps canvas in fixed length. The cutting device 4 cuts off the rubberized canvas once the wrapping is completed, the canvas wrapping process automatically ends, and thus the wrapping is completed. The canvas conveying device 1 replaces the secondary layer of rubberized canvas, and the above process is repeated to complete the wrapping once again, so that the canvas wrapping of the yarn core is automatically realized.

According to the automatic canvas wrapping machine in the invention, the cutting of the rubberized canvas is automatically completed through the cutting device 4, and the canvas wrapping length of the rubberized canvas is automatically controlled. Compared with the existing canvas wrapping apparatus adopting manual length fixation and manual cutting, the automatic canvas wrapping machine in this invention has higher control precision. The yarn core mounting device 2 can accurately control the drawing length of the yarn core, so that good uniformity is realized when the rubberized canvas is attached, higher control precision is realized, and the yield of products is greatly improved.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An automatic canvas wrapping machine, for automatically wrapping a yarn core with a rubberized canvas, the automatic canvas wrapping machine comprising:

a canvas conveying unit including:
  a frame;
  a canvas conveying device, disposed on the frame and conveying the rubberized canvas for wrapping the yarn core; and
  a cutting device, disposed on the frame and extending over the canvas conveying device; and
a yarn core mounting unit disposed on a side of the canvas conveying unit and comprising:
  a case;
  a yarn core mounting device, disposed in the case, the yarn core mounted in the yarn core mounting device and attached to the rubberized canvas conveyed by the canvas conveying device; and
  a canvas wrapping device, disposed in the case and pressing the rubberized canvas reciprocatingly along a direction vertical to the conveying direction of the canvas conveying device, so as to tightly attach the rubberized canvas to the yarn core,
wherein the cutting device is configured to cut the rubberized canvas after the canvas wrapping device completes canvas wrapping.

2. The automatic canvas wrapping machine according to claim 1, wherein the canvas wrapping device comprises a canvas wrapping roller, a canvas wrapping guide rail assembly connected with the canvas wrapping roller, and a canvas wrapping telescopic cylinder for driving the canvas wrapping guide rail assembly to move.

3. The automatic canvas wrapping machine according to claim 1, wherein the yarn core mounting device comprises a driving wheel and a driven wheel disposed along the conveying direction of the canvas conveying device, the driving wheel drives the driven wheel to rotate, and the yarn core rotates along with the driving wheel and the driven wheel and is continually attached to the rubberized canvas in rotating process.

4. The automatic canvas wrapping machine according to claim 3, wherein the yarn core mounting device further comprises a tensioning wheel and a tensioning cylinder connected with the tensioning wheel, and the yarn core is mounted on the driving wheel, the driven wheel, and the tensioning wheel.

5. The automatic canvas wrapping machine according to claim 4, wherein a guide rail is further disposed behind the yarn core mounting device along the conveying direction of the canvas conveying device, and both the tensioning wheel and the tensioning cylinder are disposed on the guide rail.

6. The automatic canvas wrapping machine according to claim 5, wherein a center distance adjusting assembly for adjusting a center distance between the tensioning wheel and the driving wheel and the center distance between the tensioning wheel and the driven wheel is further disposed on the guide rail.

7. The automatic canvas wrapping machine according to claim 4, wherein a guide rail is further disposed on one side of the yarn core mounting device along the direction vertical to the conveying direction of the canvas conveying device, and both the tensioning wheel and the tensioning cylinder are disposed on the guide rail.

8. The automatic canvas wrapping machine according to claim 6, wherein a center distance adjusting assembly for adjusting a center distance between the tensioning wheel and the driving wheel and the center distance between the tensioning wheel and the driven wheel is further disposed on the guide rail.

9. The automatic canvas wrapping machine according to claim 1, wherein the canvas conveying device comprises a rubberized canvas reel, a canvas conveying wheel, a canvas replacing assembly, and a canvas conveying platform sequentially connected with each other along the conveying direction.

10. The automatic canvas wrapping machine according to claim 9, wherein the yarn core mounting unit further comprises a canvas pressing wheel disposed between the yarn core mounting device and the canvas wrapping device.

11. The automatic canvas wrapping machine according to claim 1, wherein the yarn core mounting unit further comprises a programmable logic controller control device for controlling the canvas conveying device, the yarn core mounting device, the canvas wrapping device, and the cutting device.

* * * * *